United States Patent [19]

Tsunoda

[11] 4,401,848

[45] Aug. 30, 1983

[54] VOICE WARNING SYSTEM FOR AN AUTOMOTIVE VEHICLE

[75] Inventor: Masakazu Tsunoda, Fujisawa, Japan

[73] Assignee: Nissan Motor Company, Limited, Kanagawa, Japan

[21] Appl. No.: 193,813

[22] Filed: Oct. 3, 1980

[30] Foreign Application Priority Data

Oct. 4, 1979 [JP] Japan ................................ 54-127355

[51] Int. Cl.³ ............................................. G10L 1/00
[52] U.S. Cl. ............................. 179/1 SM; 179/1 VE; 364/513; 364/424
[58] Field of Search ....................... 179/1 SM, 1 VE; 340/147, 148, 27 R, 52 R, 52 H; 364/513, 514, 710

[56] References Cited

U.S. PATENT DOCUMENTS

| | | | |
|---|---|---|---|
| 3,641,496 | 2/1972 | Slavin | 179/1 SM |
| 3,859,629 | 1/1975 | Komiyama et al. | 179/1 VE X |
| 3,870,818 | 3/1975 | Barton | 179/1 SM |
| 4,271,402 | 6/1981 | Kastura et al. | 340/52 F |
| 4,344,136 | 8/1982 | Panik | 340/52 F |

OTHER PUBLICATIONS

Smith, "Single Chip Speech Synthesizers," Computer Design, Nov. 1978, pp. 188–192.

Primary Examiner—Emanuel S. Kemeny
Attorney, Agent, or Firm—Lowe, King, Price & Becker

[57] ABSTRACT

A voice overheat warning system for an automotive vehicle, by which the driver is informed of the cause of and measures against overheat, in voice form, in addition to the occurrence of overheat. The voice warning system comprises a radiator coolant temperature sensor, a fan-belt slipping sensor, and a radiator liquid level sensor, besides a voice synthesizer. Further, the driver can hear the voice message at an appropriate sound level as adjusted by driver preference.

10 Claims, 4 Drawing Figures

VOICE WARNING SYSTEM FOR AN AUTOMOTIVE VEHICLE

BACKGROUND OF THE INVENTION

1. Field of the Invention

The present invention relates generally to a voice warning system for an automotive vehicle, and more particularly to an engine overheat warning system which can inform the driver of the causes of and measures to be taken against overheat, in voice form, in addition to indicating the occurrence of overheat.

2. Description of the Prior Art

Heretofore, as means for informing the driver of engine overheat, that is, of an abnormally high temperature of engine coolant, there have been used various meters with pointers such as a coolant temperature gauge and various indication lamps such as a slipping fan-belt warning lamp or a radiator liquid level warning lamp.

However, since such gauges and lamps inform the driver of the necessary information on overheat only visually, it is sometimes easy for the driver to fail to notice the warning and fail to take appropriate measures against the overheat. In more detail, if overheat occurs because of a shortage of radiator liquid, it is necessary to stop the vehicle immediately, and then first to leave the engine idling for a time before stopping the engine in order to prevent the coolant temperature from further rising abruptly. However, the driver may continue to drive the vehicle without noticing that the warning lamp is on or may stop the engine immediately after having noticed that the lamp is on. In other words, in the past there has been a danger that the driver may take the wrong action when overheat occurs.

Also, as means for informing the driver of engine overheat, it is possible to design a device which produces an alarm sound through a buzzer for warning the driver that the coolant temperature is abnormally high. These devices, of course, may well call a driver's attention to the sound, but, the driver cannot in general distinguish between many different alarm sounds, and therefore in this case there are the same problems as described above.

BRIEF SUMMARY OF THE INVENTION

With these problems in mind therefore, it is the primary object of the present invention to provide a voice form overheat warning system for an automotive vehicle such that overheat is detected when the coolant temperature rises beyond a predetermined value, the causes of the overheat are discriminated, and the necessary warning message is indicated to the driver in voice form.

To achieve the above-mentioned object, the voice overheat warning system of the present invention comprises a coolant temperature sensor, a fan-belt slipping sensor, a radiator liquid level sensor, an interface, and a voice synthesizing system.

BRIEF DESCRIPTION OF THE DRAWINGS

The features and advantages of the voice warning system according to the present invention will be more clearly appreciated from the following description taken in conjunction with the accompanying drawings in which.

DETAILED DESCRIPTION OF THE PREFERRED EMBODIMENTS

Figure 1:
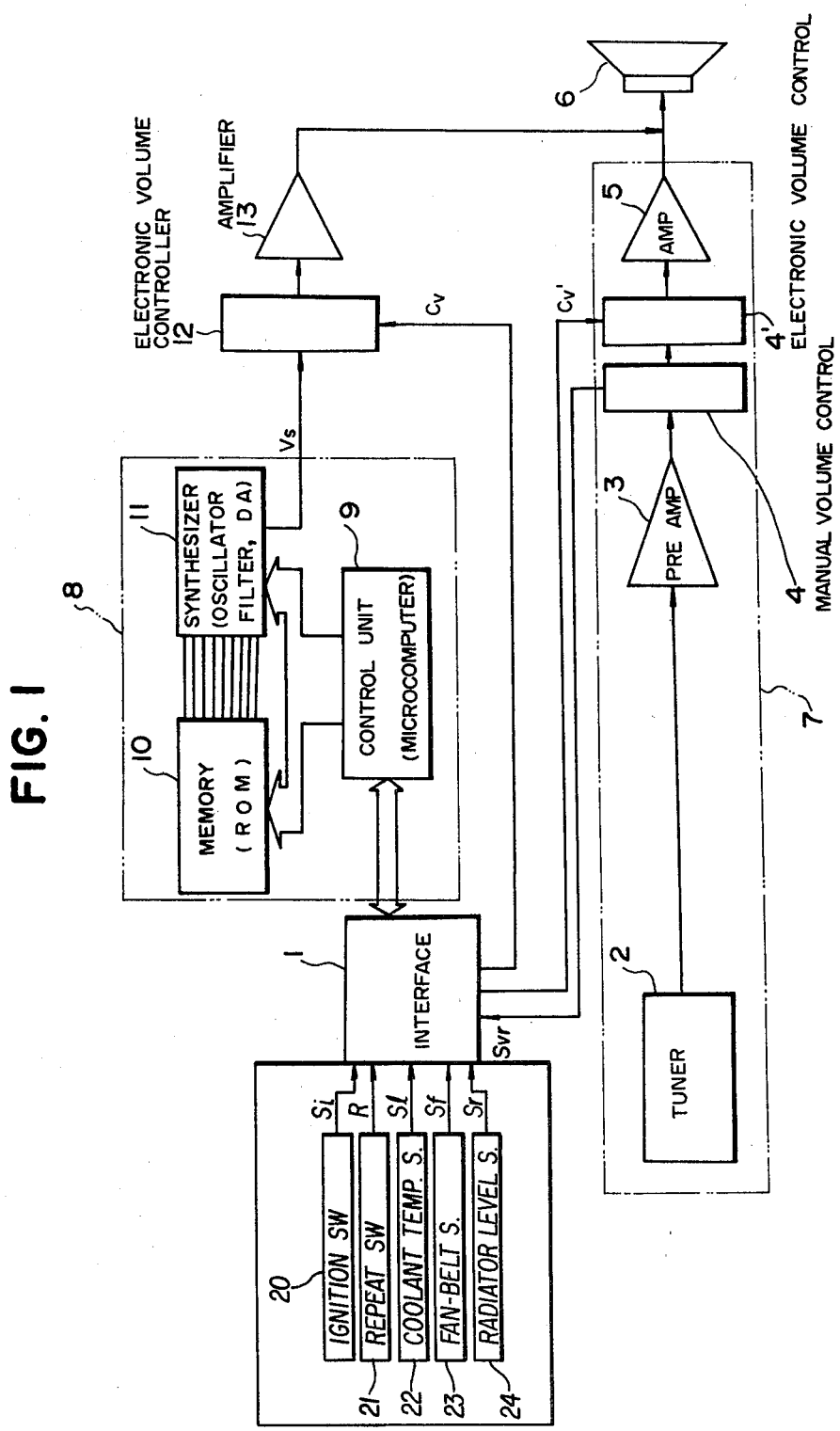
FIG. 1 is a schematic block diagram of an embodiment of the present invention.

Reference is now made to the figures, and more specifically to FIG. 1, wherein an embodiment of the present invention is illustrated.

In FIG. 1, the numeral 1 denotes an input/output interface for a microcomputer, which includes, for example, waveform shapers, A-D converters, a multiplexer, and latch circuits. To the interface 1 are input various signals such as an ignition switch on/off signal $S_i$ output from an ignition switch 20, a repeat swich on/off signal R, output from a repeat switch 21 a coolant temperature signal $S_t$ output from a coolant temperature sensor 22 only when the coolant temperature rises beyond a prescribed value (e.g. 115° C.), a slipping fan-belt signal $S_f$ output from a fan-belt slipping sensor 23 only when the fan-belt is slipping, a radiator liquid level signal $S_r$ output from a radiator liquid level sensor 24 only when the amount of radiator liquid is below a prescribed level, and a volume control signal $S_v$ indicating a sound volume value as adjusted by a volume control (variable resistor) 4 in a car radio 7. In this cae, the car radio 7 comprises a tuner 2, a preamplifier 3, the manual volume control 4, an electronic volume control 4', an amplifier 5, and a speaker 6.

It is possible to check for fan-belt slipping by comparing the output signal pulses from an alternator with those from an ignition coil and checking that the two pulse counts are kept at an appropriate constant relationship.

These different signals are read into a microcomputer (explained below) at their respective predetermined timings in order to be processed.

The numeral 8 denotes a voice synthesizer using a linear prediction coding (LPC) system including three LSI units, a memory unit (ROM) 10, a synthesizer unit 11 (oscillators, filters, and D-A converters), and a control unit 9 including a microcomputer. This control is microcomputer of contral unit 9 comprises a CPU for controlling all the operations, a memory (ROM) for storing programs and fixed data, a memory (RAM) for storing input/output data, a clock oscillator and so on.

The control unit 9 processes various signals input through the interface 1, detects overheat, determines the causes, and controls the voice synthesizer unit 11, according to a program and using the method of time sharing; that is to say, the unit 9 serves as a controller for the microcomputer and the voice synthesizer unit.

Figure 2:
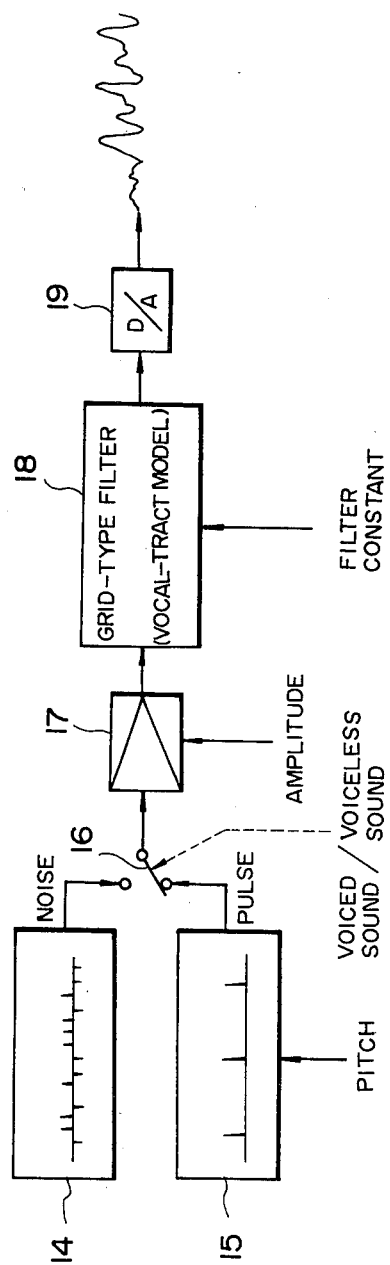
FIG. 2 is a schematic block diagram of assistance in explaining the theory of operation of a voice synthesizer using a linear prediction code system.

As is well known in the art, a voice synthesizer based on the LPC system has recently been put on the market at a reasonable price by Texas Instrument Incorporated of the USA. FIG. 2 shows schematically the principle of operation of this voice synthesizer.

In this synthesizer, pseudo-random noise signals N generated from the first sound source oscillator (white noise generator) 14 are selected by a switch 16 to produce voiceless sounds, and periodic impulse signals P generated from the second source oscillator (impulse generator) 15 are selected by the switch 16 to produce voiced sounds. After being amplified by an amplifier 17, these signals N and P are formed into a voice sound by a grid-type filter 18 where the resonance characteristics of the human vocal tract (vocal organs such as tongue and lips located above the vocal chords) in speaking is modeled, and are output as a synthesized voice signal after conversion into an analog signal through a D-A converter 19.

The different values of constants such as the pitch of the periodic impulse signal, the distinction between voiced and voiceless sounds, the ratio of the amplification of the amplifier 17, and the filter constant of the grid-type filter 18, are stored in the memory unit (ROM) 10 of FIG. 1.

The voice synthesizer unit 11 comprises various circuits which correspond to a first sound source oscillator 14, a second sound source oscillator 15, a switch 16, an amplifier 17, a grid-type filter 18, and a D-A converter 19 so that the synthesized voice sound signal $V_s$ necessary for warning information can be output after being controlled according to the output signal selected by the control unit 9.

The voice signal $V_s$ output from the voice synthesizer 8 is adjusted by means of an electronic volume controller 12, amplified by an amplifier 13, and output through a speaker 6 provided in the car radio 7.

In this case, the microcomputer of control unit 9 determines the voice output volume according to a sound volume value as set by the volume control 4 provided in the car radio 7 (determined by the use of a signal $S_{vr}$) and outputs a voice volume control signal $C_v$ through the interface 1 to the electronic volume control 12, so that the voice volume can be adjusted to an appropriate level based on driver preference.

Figure 3:
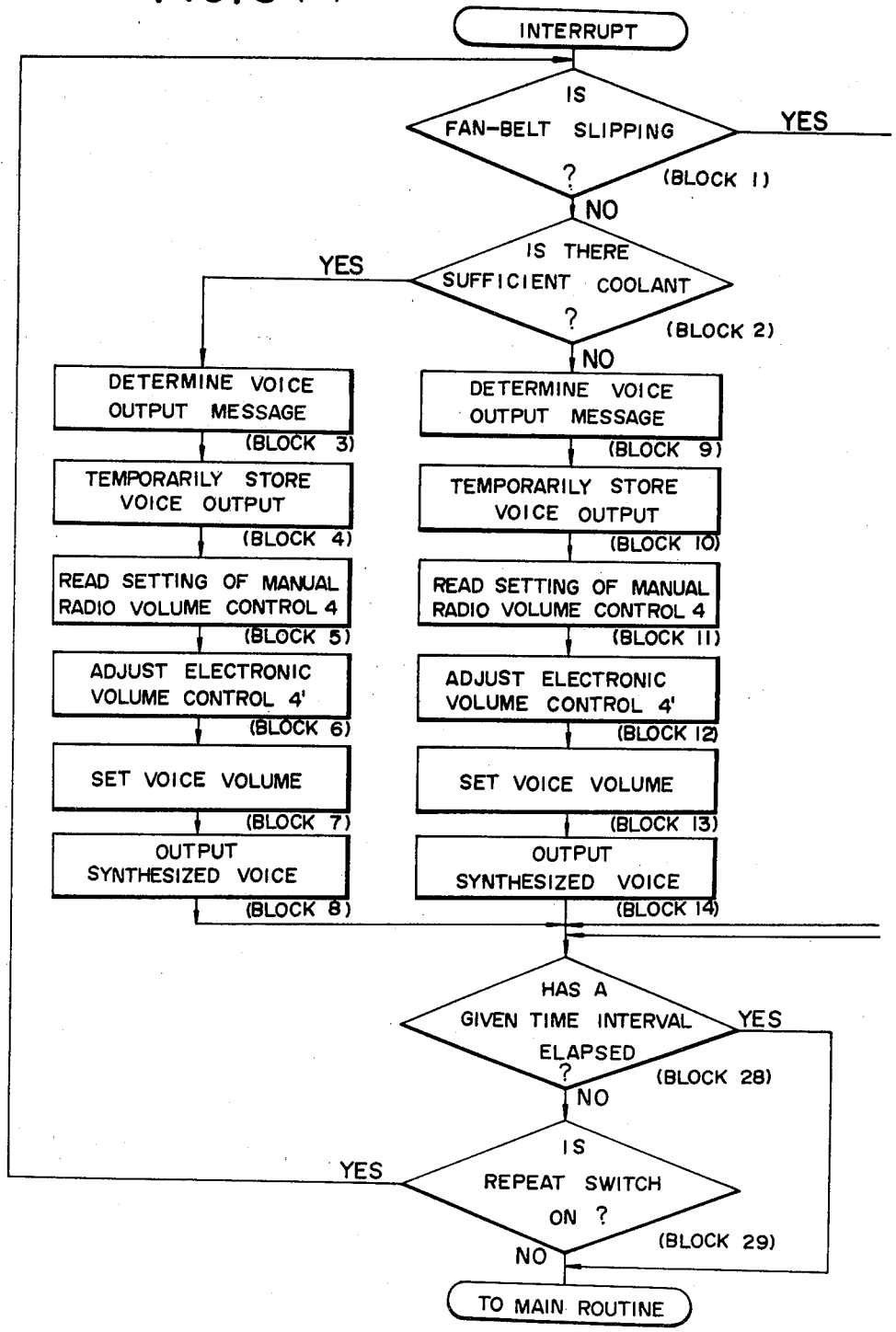
FIGS. 3a and 3b show a flowchart of a sample program used with the microcomputer provided for the present invention.
Figure 3:
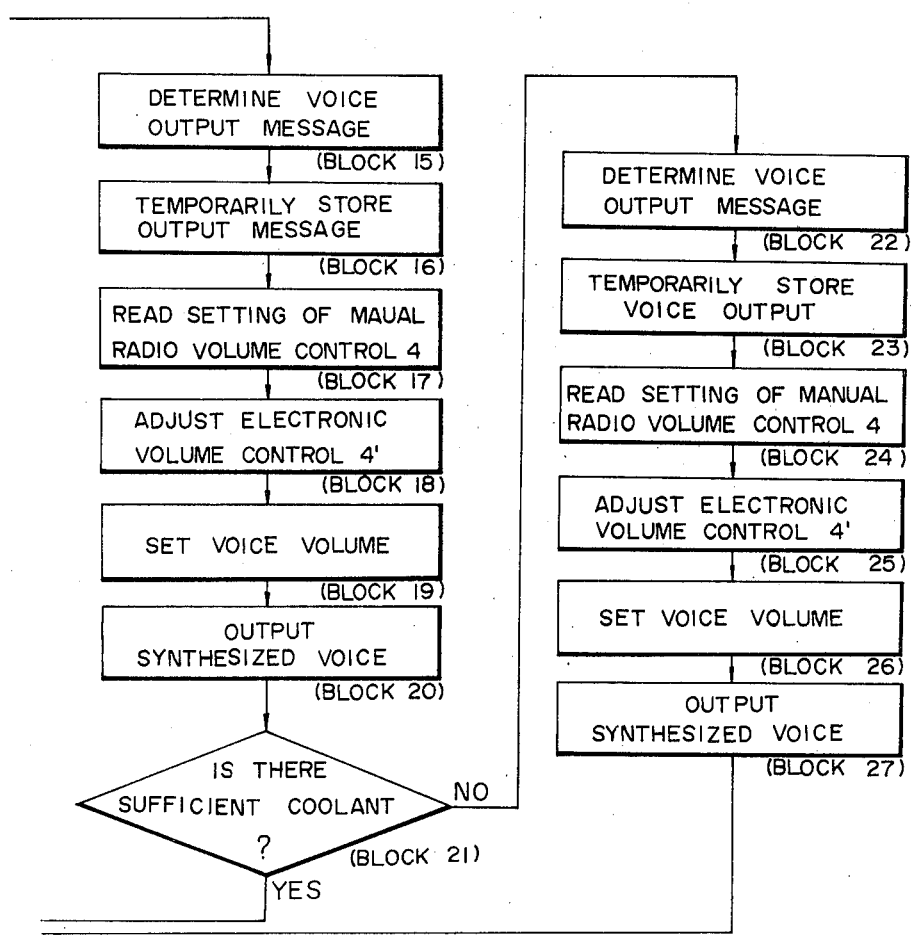

FIGS. 3a and 3b show a sample program used with the microcomputer in the control unit 9.

In this flowchart, when the ignition switch is turned on, the microcomputer starts to execute each program of the main routine (not shown) in turn. The program periodically checks whether a coolant temperature signal $S_t$, which indicates a coolant temperature above a predetermined value (e.g. 115° C.), is input to the interface 1. If this signal $S_t$ is input, the program determines overheat and executes the interrupt routine shown in FIGS. 3a and 3b, before returning to the main routine.

In FIGS. 3a and 3b first the program checks whether or not a fan-belt slipping signal $S_f$ is input from the fan belt slipping sensor to the interface 1 (block 1), and if so the program determines that the fan-belt is slipping, selects a necessary voice output message such as, for example, "Overheat, stop the car immediately because the fan-belt is slipping (block 15)", and temporarily stores the voice output message in the RAM of the microcomputer (block 16). Next the program checks the signal $S_{vr}$ indicating the volume as set by the manual volume control 4 of the car radio 7 (block 17), and reduces the sound volume of the car radio 7 by adjusting the electronic volume control 4' while sending a voice volume control signal $C_v'$ from the interface 1 (block 17). The electronic volume control 12 is controlled by a sound volume signal $C_v$ according to the signal $S_{vr}$ and the voice volume is set by the electronic volume control 12 (block 19). The memory unit 10 and the voice synthesizer unit 11 are controlled, in accordance with the voice output message previously stored temporarily, to produce synthesized voice signals $V_s$, and output the necessary voice message through the electronic volume control 12, amplifier 13 and speaker 6 to inform the driver that the engine must be stopped immediately because overheat results from the fan-belt slipping (block 20).

Next, the program checks whether or not a radiator liquid level signal $S_r$ is input to the interface 1, to indicate that the amount of radiator liquid is below a predetermined level (block 21). If input, the program selects a voice output message such as, for example, "Replenish radiator liquid" (block 22) and stores this message temporarily in the RAM of the microcomputer in the control unit 9 (block 23). In the same way as in the above case, the program checks a signal $S_{vr}$ of the sound volume as set by the manual volume control 4 in the car radio 7 (block 24), and reduces the sound volume of the car radio by adjusting the electronic volume control 4' while sending a voice volume control signal $C_v'$ from the interface 1 (block 25). The electronic volume control 12 is controlled by a sound volume control signal $C_v$ and the voice volume is set (block 26). The memory unit 10 and the voice synthesizer unit 11 are controlled, in accordance with the voice output message previously stored temporarily, to produce synthesized voice signals $V_s$ to inform the driver of the shortage of radiator liquid (block 27). Then the program proceeds to the next block 28. If the radiator liquid is above the predetermined level (block 21), the program also proceeds to the same block 28.

On the other hand, at the step of block 1, when the program determines no fan-belt looseness, the program checks whether or not a radiator liquid level signal $S_r$ is input to the interface 1, which indicates that the amount of radiator liquid is below a predetermined level (block 2). And, if input, the program determines a voice output message such as, for example, "Overheat, stop the engine after idling, because of shortage of radiator liquid" (block 9) and stores this message temporarily in the RAM of the microcomputer (block 10).

After the same steps from blocks 11 to 14 as already explained above, the driver is informed of the message that the engine must be stopped because overheat results from shortage of radiator liquid, in voice form, according to the sound volume as set by the manual volume control 4 in the car radio 7.

On the other hand, if the program determines that the radiator liquid level is normal (block 2), the program selects a voice output message such as, for example, "Overheat because of overload: let the engine idle and then stop" (block 3), and informs the driver of the voice message, after the same steps from block 4 to 8 as already explained above, according to the sound volume as set by the manual volume control 4 in the car radio 7.

In block 28, the program checks whether a particular interval (e.g. two minutes) has elapsed after a voice message has been output and, if elapsed, the program returns again to the main routine which has been interrupted by the cooling water temperature signal. But, within the interval, the program checks whether the repeat switch is on, and if on, the program executes the steps again to reoutput the voice message beginning from block 1. If off, the program returns to the main routine. This repeat switch is useful when the driver fails to hear a message.

In the above embodiment, the software interrupt in response to an overheat is generated, in the course of the process of execution of the various programs of the main routine, by checking periodically whether or not a coolant temperature signal $S_t$ is input from the cooling water sensor to the interface 1 to indicate that the water temperature is above a predetermined level, but it is also possible to use a hardware interrupt terminal of the microcomputer or to generate the interrupt by checking the presence of the signal $S_t$ only once for every execution of the main routine.

As described above, according to the present invention, since overheat is automatically checked, and the causes and action to be taken are indicated to the driver, in voice form, whenever overheat occurs while the vehicle is traveling, the driver can take the necessary action easily and reliably.

In addition, since a car-radio sound volume as adjusted by driver preference is also checked, it is possible to provide the driver with the voice message at an appropriate sound level according to driver preference.

It will be understood by those skilled in the art that the foregoing description is in terms of a preferred embodiment of the present invention wherein various changes and modifications may be made without departing from the spirit and scope of the invention, which is to be defined by the appended claims.

What is claimed is:

1. A voice warning system for informing a driver of an automotive vehicle, provided with a radiator filled with coolant and with a fan belt for driving a fan, of an overheat condition and of corrective actions to be taken, which comprises:
   (a) a coolant temperature sensing means for outputting a coolant temperature signal $S_t$ only when coolant temperature exceeds a predetermined temperature;
   (b) a fan-belt slippage sensing means for outputting a fan-belt slippage signal $S_f$ only when the fan belt is slipping;
   (c) a radiator coolant level sensing means for outputting a radiator level signal $S_r$ only when coolant level in the radiator is below a predetermined level;
   (d) a microcomputer means connected to said coolant temperature sensing means, to said fan-belt slippage sensing means, and to said radiator coolant level sensing means, said microcomputer means operatively connected to said sensing means for periodically checking for the presence of the coolant temperature signal $S_t$ and, in response to the presence of the coolant temperature signal $S_t$, for sequentially checking for the presence of the fan-belt slippage signal $S_f$ and the radiator coolant level signal $S_r$, said microcomputer means determining appropriate voice output messages in response to the presence or absence of the coolant temperature signal $S_t$, the fan-belt slippage signal $S_f$ and the radiator coolant level signal $S_r$, and outputting voice output message signals corresponding to the detected signals;
   (e) a voice synthesizer means connected to said microcomputer means for indicating the occurrence and causes of an overheat condition by synthesizing voice output messages in response to the voice output message signals output from said microcomputer, and
   (f) a loudspeaker connected to said voice synthesizer means for outputting voice output messages synthesized by said synthesizer means for indicating to the vehicle driver of both the overheat condition and the corrective actions to be taken for correcting the overheat condition.

2. A voice warning system for informing a vehicle driver of an overheat condition as set forth in claim 1, which further comprises:
   (a) a volume control means provided in a car radio for providing to said microcomputer means a volume control signal $S_{vr}$ indicative of a car-radio sound volume level as selected by the driver; and
   (b) an electronic volume controller connected between said voice synthesizer and said loudspeaker for responding to the volume control signal $S_{vr}$ by adjusting the voice volume of the voice output messages synthesized by output of said loudspeaker.

3. A voice warning system for informing a vehicle driver of an overheat condition as set forth in either claim 1 or 2, which further comprises a repeat switch connected to said microcomputer for outputting a repeat switch signal R to repeat the voice output message to the driver when said repeat switch is activated.

4. A voice warning system as recited in claim 2 wherein said volume control means comprises a variable resistance.

5. A method of indicating to a vehicle driver, in voice form, of an overheat condition in an automotive vehicle having a radiator filled with a quantity of coolant and a fan belt for driving a fan which comprises the steps of:
   (a) periodically checking whether or not coolant temperature rises above a predetermined value;
   (b) if above a predetermined value, checking whether or not the fan belt is slipping;
   (c) if the fan belt is not slipping, checking whether or not the quantity of coolant is sufficient;
   (d) if the quantity of coolant is sufficient, determining and outputting a voice output message indicative of the occurrence of an overheat condition;
   (e) if the fan belt is not slipping but the quantity of coolant is insufficient, determining and outputting a voice output message indicative of the occurrence of an overheat condition due to insufficient quantity of coolant;
   (f) if the fan belt is slipping, determining and outputting a voice output message indicative of the occurrence of an overheat condition due to fan-belt slippage;
   (g) after outputting the voice output message indicative of overheat due to fan-belt slippage, checking whether or not the quantity of coolant is sufficient; and
   (h) if the quantity of coolant is insufficient, additionally determining and outputting a voice output message further indicative of the overheat condition being due to an insufficient quantity of coolant.

6. A method of indicating to a vehicle driver in voice form, of an overheat condition in an automotive vehicle having a radiator filled with a quantity of coolant, and a fan belt for driving a fan as set forth in claim 5, which further comprises the steps of:
   (a) temporarily storing any of the voice output messages determined in claim 5; and
   (b) checking a car-radio sound volume value as set by a manual volume control of a car radio of the automotive vehicle; and
   wherein said outputting steps each comprise the step of
   (c) setting the sound volume value of the voice output message to be output at a volume set according to the checked car-radio sound volume value before outputting the determined voice output message.

7. A method of indicating to a vehicle driver, in voice form, of an overheat condition in an automotive vehicle having a radiator filled with a quantity of coolant and a fan belt for driving a fan, as set forth in claim 6, wherein said step of checking a car-radio sound volume value further comprises the step of:
   reducing the car-radio sound volume from the checked car-radio sound volume value prior to outputting the determined voice message.

8. A method of indicating to a vehicle driver, in voice form, of an overheat condition in an automotive vehicle having a radiator filled with a quantity of coolant and a fan belt for driving a fan as set forth in either claim 5 or 6, which further comprises the steps of:
   (a) after outputting the determined voice output message, determining whether or not a repeat switch is actuated;
   (b) if the repeat switch is actuated, performing the previously recited step of checking whether or not the fan belt is slipping and the further steps associated therewith.

9. A method of indicating to a vehicle driver, in voice form, of an overheat condition in an automotive vehicle having a radiator filled with a quantity of coolant and a fan belt for driving a fan as set forth in claim 8 which further comprises the steps of:
   (a) determining whether or not a predetermined time interval has elapsed after the step of outputting the determined voice output message;
   (b) if the predetermined time interval has not elapsed, performing said step of determining whether or not the repeat switch is actuated; and
   (c) if the predetermined time interval has not elapsed and the repeat switch is determined to be actuated, performing the previously recited step of checking whether or not the fan belt is slipping and the further steps associated therewith.

10. A method of indicating to a vehicle driver, in voice form, of an overheat condition in an automotive vehicle having a radiator filled with a quantity of coolant and a fan belt for driving a fan as set forth in claim 9 which further comprises the step of concluding a iteration of the method if the predetermined time interval has elapsed.

* * * * *